United States Patent
Gong et al.

(10) Patent No.: US 11,210,049 B2
(45) Date of Patent: Dec. 28, 2021

(54) DISPLAY CONTROL METHOD AND TERMINAL

(71) Applicant: VIVO MOBILE COMMUNICATION CO., LTD., Guangdong (CN)

(72) Inventors: Liuqing Gong, Chang'an Dongguan (CN); Qinghu Cui, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/106,020

(22) Filed: Nov. 27, 2020

(65) Prior Publication Data

US 2021/0081158 A1    Mar. 18, 2021

Related U.S. Application Data (63) Continuation of application No. PCT/CN2019/088499, filed on May 27, 2019.

(30) Foreign Application Priority Data

May 29, 2018  (CN) .......................... 201810532285.1

(51) Int. Cl.
    *G06F 3/14*    (2006.01)
    *G06F 3/0481*    (2013.01)
    *G06F 3/0488*    (2013.01)

(52) U.S. Cl.
    CPC .......... *G06F 3/1423* (2013.01); *G06F 3/0481* (2013.01); *G06F 3/04886* (2013.01)

(58) Field of Classification Search
    None
    See application file for complete search history.

(56) References Cited

U.S. PATENT DOCUMENTS

| | | | | |
|---|---|---|---|---|
| 11,079,995 B1 * | 8/2021 | Hulbert | ................. | G06F 3/0482 |
| 2010/0293502 A1 * | 11/2010 | Kang | ..................... | G09G 3/003 |
| | | | | 715/803 |
| 2012/0060089 A1 * | 3/2012 | Heo | ...................... | G06F 3/1431 |
| | | | | 715/702 |
| 2012/0218191 A1 | 8/2012 | Huang et al. | | |

(Continued)

FOREIGN PATENT DOCUMENTS

| | | |
|---|---|---|
| CN | 103635955 A | 3/2014 |
| CN | 104113780 A | 10/2014 |

(Continued)

OTHER PUBLICATIONS

Chinese Office Action issued in corresponding application No. 201810532285.1, dated Sep. 29, 2020.

(Continued)

*Primary Examiner* — Toan H Vu
(74) *Attorney, Agent, or Firm* — Maschoff Brennan

(57) ABSTRACT

A display control method and a terminal are provided. The method includes: receiving a first input of a user on a first screen; switching a first program interface of a first program from being displayed on a second screen to being displayed on the first screen in response to the first input; and displaying a first floating window on the second screen. A first display content in the first floating window is updated synchronously with a second display content of the first program interface.

20 Claims, 6 Drawing Sheets front display screen front display screen

(56) References Cited

U.S. PATENT DOCUMENTS

| | | | |
|---|---|---|---|
| 2014/0071160 A1* | 3/2014 | Sugiura | G06F 16/50 |
| | | | 345/619 |
| 2014/0135069 A1* | 5/2014 | Jung | H04M 1/575 |
| | | | 455/566 |
| 2014/0204040 A1* | 7/2014 | Kim | G06F 3/0483 |
| | | | 345/173 |
| 2014/0282745 A1* | 9/2014 | Chipman | H04N 21/47214 |
| | | | 725/61 |
| 2014/0310643 A1 | 10/2014 | Karmanenko et al. | |
| 2014/0340334 A1* | 11/2014 | Cho | G06F 3/0487 |
| | | | 345/173 |
| 2015/0220504 A1* | 8/2015 | Bocanegra Alvarez | |
| | | | G06F 40/169 |
| | | | 715/233 |
| 2015/0268852 A1* | 9/2015 | Otsuka | G06F 1/163 |
| | | | 345/173 |
| 2016/0117141 A1* | 4/2016 | Ro | G06F 3/04817 |
| | | | 715/748 |
| 2016/0334989 A1 | 11/2016 | Liu et al. | |
| 2017/0010771 A1 | 1/2017 | Bernstein et al. | |
| 2017/0018258 A1 | 1/2017 | Yeung | |
| 2017/0025096 A1 | 1/2017 | Fan et al. | |
| 2017/0195613 A1 | 7/2017 | Yang | |
| 2017/0206861 A1* | 7/2017 | Rojas | G06F 1/1643 |
| 2021/0081158 A1 | 3/2021 | Gong et al. | |

FOREIGN PATENT DOCUMENTS

| | | |
|---|---|---|
| CN | 104793839 A | 7/2015 |
| CN | 105334916 A | 2/2016 |
| CN | 105549858 A | 5/2016 |
| CN | 105791953 A | 7/2016 |
| CN | 105867762 A | 8/2016 |
| CN | 106210307 A | 12/2016 |
| CN | 106658115 A | 5/2017 |
| CN | 107613362 A | 1/2018 |
| CN | 107943407 A | 4/2018 |
| CN | 108829304 A | 11/2018 |
| CN | 108881617 A | 11/2018 |

OTHER PUBLICATIONS

Chinese Search Report issued in corresponding application No. 201810532285.1, dated Mar. 12, 2020.

International Search Report and Written Opinion issued in corresponding application No. PCT/CN2019/088499, dated Dec. 10, 2020.

EP Search Report in Application No. 19811277.3 dated Jul. 8, 2021.

* cited by examiner

DISPLAY CONTROL METHOD AND TERMINAL

CROSS-REFERENCE TO RELATED APPLICATION

The present application is a continuation of PCT Application No. PCT/CN2019/088499 filed on May 27, 2019, which claims a priority of the Chinese patent application No. 201810532285.1 filed in China on May 29, 2018, which is incorporated herein by reference in its entirety.

TECHNICAL FIELD

The present disclosure relates to the field of communication technology, and in particular to a display control method and a terminal.

BACKGROUND

With the continuous development of science and technology and the wide use of smart terminals, mobile terminals such as mobile phones have become indispensable electronic products in people's daily lives. For terminals in related art, when a current video is playing advertisements or when a current game is downloading resources, users need to wait until the advertisement or the download of the game resources is over before continuing to watch the video or play the game, and this will waste a lot of user time. Moreover, if the user operates and uses other applications during the waiting time, it may cause interruption of video playback or reloading of the game.

SUMMARY

In a first respect, embodiments of the present disclosure provide a display control method, which is applied to a terminal device that includes a first screen and a second screen. The method includes: receiving a first input of a user on the first screen; switching a first program interface of a first program from being displayed on the second screen to being displayed on the first screen in response to the first input; and displaying a first floating window on the second screen, wherein a first display content in the first floating window is updated synchronously with a second display content of the first program interface.

In a second aspect, embodiments of the present disclosure further provide a terminal, including a first receiving module configured to receive a first input of a user on a first screen; a first display module configured to switch a first program interface of a first program from being displayed on a second screen to being displayed on the first screen in response to the first input; and a second display module configured to display a first floating window on the second screen, wherein a first display content in the first floating window is updated synchronously with a second display content of the first program interface.

In a third aspect, embodiments of the present disclosure further provide a terminal including a processor, a memory, and a computer program stored on the memory and capable of running on the processor, wherein steps of the display control method as described above are implemented when the computer program is executed by the processor.

In a fourth aspect, embodiments of the present disclosure further provide a computer-readable storage medium having a computer program stored thereon, wherein steps of the display control method as described above are implemented when the computer program is executed by a processor.

DETAILED DESCRIPTION

The technical solutions of the embodiments of the present disclosure will be clearly described in conjunction with the drawings in the embodiments of the present disclosure. It is obvious that the described embodiments are a part of, rather than all of, the embodiments of the present disclosure. Based on the described embodiments of the present disclosure, a person having ordinary skill in the art can obtain all other embodiments, which should fall within the scope of protection of the present disclosure.

Figure 1:
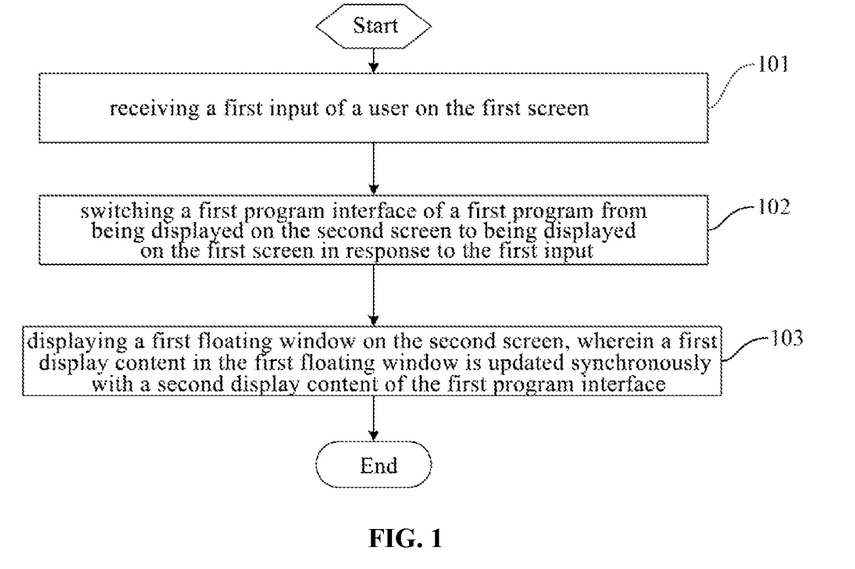
FIG. 1 is a first schematic flowchart of a display control method provided by an embodiment of the disclosure.

FIG. 1 is a schematic flowchart of a display control method provided by an embodiment of the present disclosure. An implementation process of the method will be described in detail in conjunction with this figure.

It should be noted that an embodiment of the present disclosure provides a display control method, which is applied to a terminal device that includes a first screen and a second screen. The terminal device may be a double-sided screen terminal or a folding screen terminal, and it is not particularly limited here.

In this embodiment, the display control method may include the following steps.

In step 101, a first input of a user on the first screen is received.

In this step, the first input is a preset input, which may include, but is not limited to, at least one of a click input, a press input, a long press input, a pinch input, a drag input, a slide input, and a swipe input. In other words, the first input may be one of, or a combined input of two or more of, the above-mentioned inputs.

Here, optionally, the first input is a double-click input. The double-click input is set to a switching input for switching a program interface of a program from being displayed on a screen to being displayed on other screens, and its operation is simple and easy for a user to perform.

In step 102, in response to the first input, a first program interface of a first program is switched from being displayed on the second screen to being displayed on the first screen.

In this step, in response to the first input received in step 101, the terminal device switches the first program interface of the first program from being displayed on the second screen to being displayed on the first screen, thereby realizing the switching of the first program interface of the first program, and enabling the simplifying of the switching operation of the first program without interruption of the running of the first program.

Here, the first program interface of the first program is a foreground display interface of the first program.

The first and second screens are two different screens on the terminal device. In an example, the terminal device includes only two screens for example, and the second screen is the other screen than the first screen. It should be noted that the terminal device may include other screens in addition to the first screen and the second screen. In another example, the terminal device includes three screens for example, and the second screen is one or the other two of the screens other than the first screen, and it can be defined according to user settings or system default settings of the terminal device.

Figure 2:
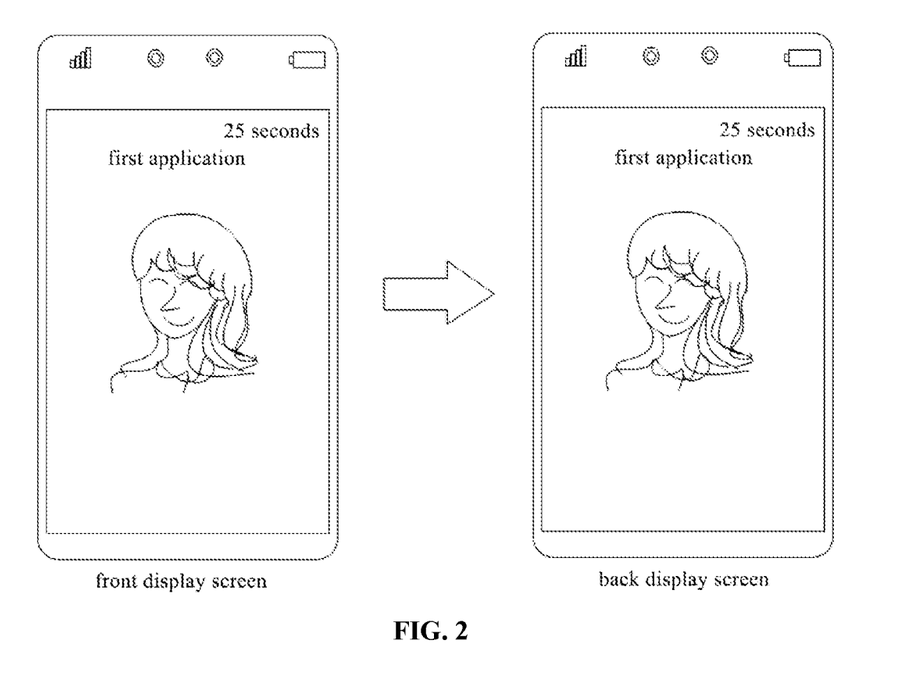
FIG. 2 is a first schematic diagram showing an exemplary implementation process of a display control method of the present disclosure.

Here, the description will be made with reference to an example in which the mobile terminal includes only two screens, which are provided oppositely and arranged on front and back sides of the terminal device, respectively. As shown in FIG. 2, before receiving a first input on a back screen, a program interface of a first application is displayed on a front screen of the terminal device (as illustrated in a left part of the figure), and after steps 101 and 102 of this method are performed, the program interface of the first application is displayed on the back screen of the terminal device (as illustrated in a right part of the figure). In this way, the switching of the program interface of the first application is realized, and the switching running of the application can be simplified without interruption of the running of the first application.

Figure 3:
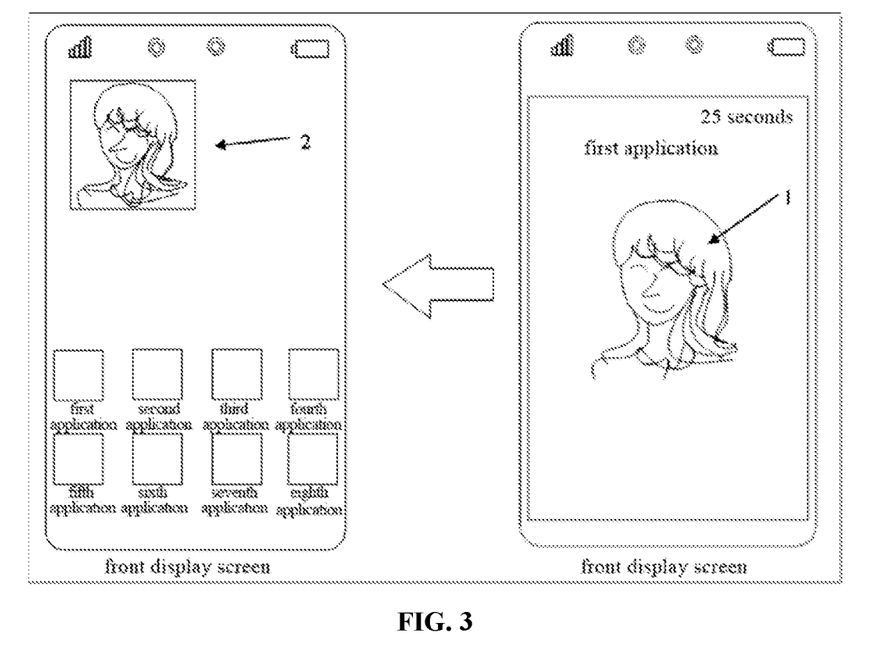
FIG. 3 is a second schematic diagram showing another exemplary implementation process of a display control method of the present disclosure.

In addition, in the embodiment of the present disclosure, after the terminal device responds to the first input, the second screen can be further controlled to display a preset content interface, such as an application navigation interface, as illustrated in a left part of FIG. 3. Here, the preset content interface can be set depending on design requirements or user requirements, and is not particularly limited in the embodiment of the present disclosure. Taking the application navigation interface as an example, the terminal device can receive an input of the user on a target application icon on the application navigation interface, and display, on the first screen, a program interface of an application corresponding to the target application icon in response to the input. That is, multiple applications can run on the terminal device simultaneously and their program interfaces do not affect each other.

In step 103, a first floating window is displayed on the second screen.

In this step, a first display content in the first floating window is updated synchronously with a second display content of the first program interface.

It should be noted that the first floating window may display the first display content updated in synchronization with the second display content of the first program interface as thumbnails. As shown in FIG. 3, the second display content of the first program interface 1 of the first program is a long-haired girl, and the first display content in the first floating window 2, that is, a prompt window shown on the left in FIG. 3, is the long-haired girl.

Here, the purpose of displaying the first floating window 2 on the second screen is to facilitate the user to check a display state of the first program interface 1 of the first program at any time. For example, when the first program is a playback application, it is convenient for the user to check, on the second screen, a progress state of the played content of the first program interface of the first program at any time.

In addition, the first floating window 2 is designed such that movement on the second screen through a user operation is facilitated without blocking the display content on the second screen, and at the same time, it is convenient for the user to make a subsequent input on the second screen.

In the embodiment of the present disclosure, the first program interface of the first program can be switched from being displayed on the second screen to being displayed on the first screen through the first input on the first screen, and the user can operate other applications on the second screen, making full use of the additional time that the user needs to wait when the first program is being used. Since the floating window of the first display content that is updated synchronously with the second display content of the first program interface is displayed on the second screen, a display state of the first program interface of the first program can be also viewed while the other programs are being operated.

Based on the embodiment as shown in FIG. 1, in order to prevent the user from mal-operation of the first program interface of the first program when the user is holding the terminal device, the method further includes receiving a sixth input on the first screen and controlling a response of the first program to the sixth input to be invalid in an optional example of the embodiment of the present disclosure.

It should be noted that the sixth input is an arbitrary input on the first screen. When the sixth input is the first input, the first screen responds to the sixth input, but the first program does not respond to the sixth input, so as to prevent the mal-operation of the first program interface of the first program on the first screen.

Figure 4:
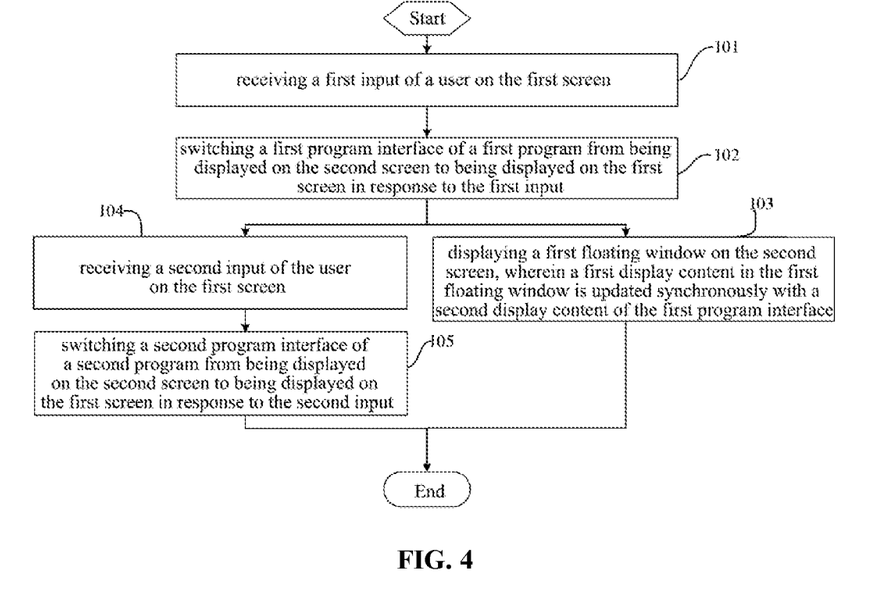
FIG. 4 is a second schematic flowchart of a display control method provided by another embodiment of the disclosure.

In an optional embodiment of the present disclosure, after switching the first program interface of the first program from being displayed on the second screen to being displayed on the first screen in response to the first input in step 102, as shown in FIG. 4, the method further includes step 104, in which a second input of the user on the first screen is received.

In this step based on step 102, that is, when the first program interface of the first program is displayed on the first screen, the terminal device receives the second input of the user on the first screen.

Here, the second input is a preset input, which may include, but is not limited to, at least one of a click input, a press input, a long press input, a pinch input, a drag input, a slide input, and a swipe input. In other words, the first input may be one of, or a combined input of two or more of, the above-mentioned inputs.

Optionally, the second input is a same input operation as the first input, that is, the mobile terminal can receive the first input of the user on the first screen again, so that the program interface of the program displayed on the second screen is switched to being displayed on the first screen again.

In step 105, in response to the second input, a second program interface of a second program is switched from being displayed on the second screen to being displayed on the first screen.

In this step, in response to the second input received in step 104, the terminal device switches the second program interface of the second program from being displayed on the second screen to being displayed on the first screen. In this way, it is possible for the user to operate other applications on the second screen as needed, and while the other applications are being operated, the running of the program whose program interface is on the first screen is not interrupted so that the user can use the program at any time.

It should be noted that, in the embodiment of the present disclosure, when at least two inputs including the first input and the second input on the first screen are received, program interfaces of at least two programs are displayed on the first screen in a preset manner.

Here, in the embodiment of the present disclosure, the program interfaces of the at least two programs can be displayed on the first screen. Herein, the program interfaces of the at least two programs are displayed in the preset manner. The preset display manner here includes, but is not limited to, at least one of split-screen display, stacking display (in which a program interface of a program first displayed on the first screen is located at the bottom, and a program interface of a program finally displayed on the first screen is located at the top), and thumbnail display.

Based on the embodiment as shown in FIG. 4, in order to prevent the user from mal-operation of the first program interface of the first program and the second program interface of the second program on the first screen when the user is holding the terminal device, the method further includes receiving a seventh input on the first screen and controlling responses of the at least two programs to the seventh input to be invalid in an optional example of the embodiment of the present disclosure.

It should be noted that the seventh input is an arbitrary input on the first screen. When the seventh input is the first input, the first screen responds to the seventh input, but the at least two programs on the first screen do not respond to the seventh input, so as to prevent the mal-operation of the program interfaces of the at least two programs on the first screen.

Based on the embodiment as shown in FIG. 4, in an optional embodiment of the present disclosure, after switching the second program interface of the second program from being displayed on the second screen to being displayed on the first screen in response to the second input in step 105, the method further includes displaying a second floating window on the second screen.

In this step, a third display content of the second floating window is updated synchronously with a fourth display content of the second program interface.

This step is similar to step 103 in the embodiment as shown in FIG. 1, and for its specific description, reference may be made to the above description of the corresponding part shown in FIG. 1, and it will not be repeated here.

It should be noted that at this time, two floating windows are displayed on the second screen, and the first floating window corresponds to the first program in the first screen, and the second floating window corresponds to the second program in the first screen. Through the two floating windows, the user can see the display states of the program interfaces of the two corresponding programs at the same time.

Figure 5:
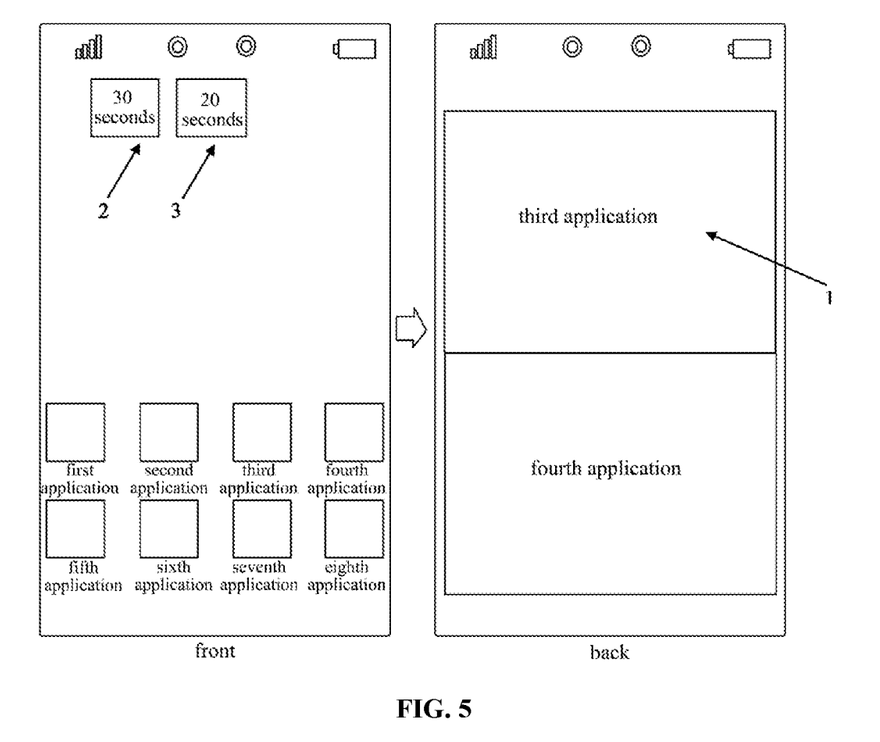
FIG. 5 is a third schematic diagram showing a further exemplary implementation process of a display control method of the present disclosure.

The description will be made with reference to an example in which the mobile terminal includes only two screens, which are provided oppositely and arranged on front and back sides of the terminal device, respectively. As shown in FIG. 5, in particularly as shown in a left part of this figure, there are two floating windows displayed on a front screen, i.e., a first floating window 2 and a second floating window 3, which correspond to a third application and a fourth application, respectively, and as shown in a right part of the figure, program interfaces of the third application and the fourth application are displayed on a back screen.

In addition, in the embodiment of the present disclosure, after the terminal device responds to the second input, the second screen can be further controlled to display a preset content interface, such as an application navigation interface, as illustrated in the left part of FIG. 5. Here, the preset content interface can be set depending on design requirements or user requirements, and is not particularly limited in the embodiment of the present disclosure.

Here, further, in the embodiment of the present disclosure, after displaying the second floating window on the second screen, the method further includes receiving a third input of the user on the first floating window and the second floating window.

In this step, the third input is a preset input, which may include, but is not limited to, at least one of a click input, a press input, a long press input, a pinch input, a drag input, a slide input, and a swipe input. In other words, the third input may be one of, or a combined input of two or more of, the above-mentioned inputs.

It should be noted that the third input can be the user's separate inputs on the first floating window and the second floating window, or the user's simultaneous inputs on the first floating window and the second floating window. An execution order of the inputs will not be particularly limited here.

In response to the third input, the first program interface of the first program and the second program interface of the second program are switched from being displayed on the first screen to being displayed in split screens on the second screen.

In this step, in response to the third input received in the above step, the first program interface of the first program displayed and the second program interface of the second program on the first screen are switched by the terminal device to display on the second screen in a split-display manner.

Here, according to the needs of the user, the first program interface of the first program and the second program interface of the second program, which are displayed on the first screen as a result of the execution of step 105, can switched to being displayed on the second screen again through the third input on the first floating window and the second floating window, so that it is convenient for users to view and operate them.

Figure 6:
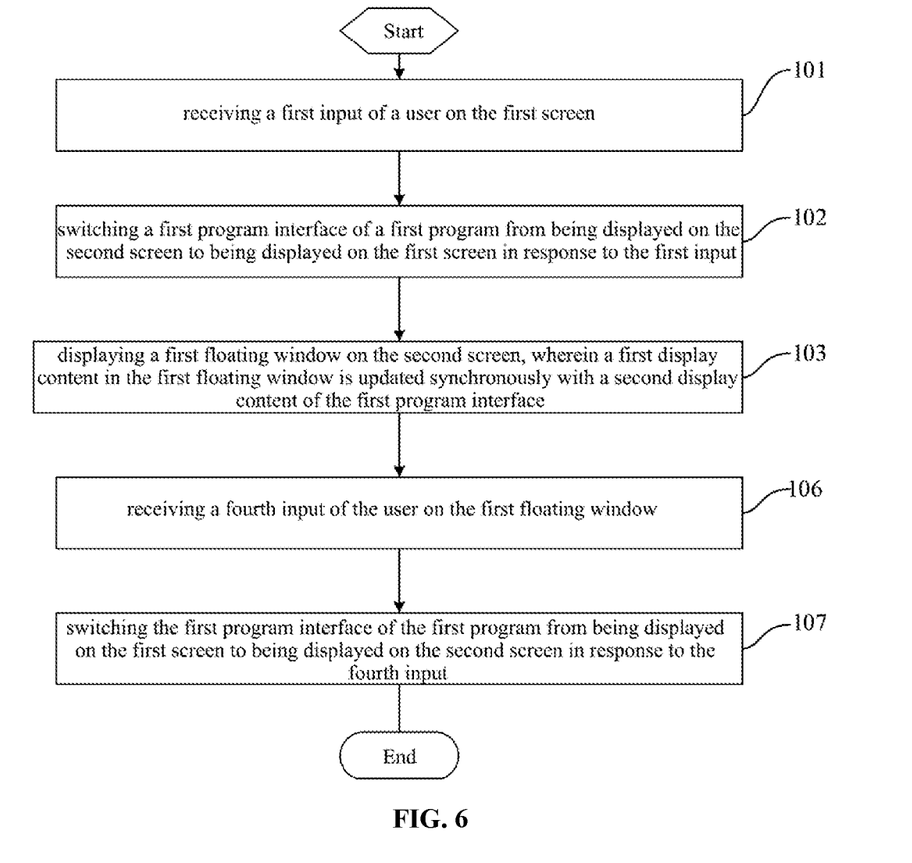
FIG. 6 is a third schematic flowchart of a display control method provided by a further embodiment of the disclosure.

Based on the embodiment shown in FIG. 1, in an optional embodiment of the present disclosure as shown in FIG. 6, the method further includes step 106, in which a fourth input of the user on the first floating window is received.

In this step after step 103, the fourth input on the first floating window is received.

Here, the fourth input is a preset input, which may include, but is not limited to, at least one of a click input, a press input, a long press input, a pinch input, a drag input, a slide input, and a swipe input. In other words, the fourth input may be one of, or a combined input of two or more of, the above-mentioned inputs.

Optionally, the fourth input is a single-click input. Here, the single-click input is adopted as the fourth input in the embodiment of the present disclosure, which can realize the simplicity of user operations.

In step 107, in response to the fourth input, the first program interface of the first program is switched from being displayed on the first screen to being displayed on the second screen.

In this step, in response to the fourth input received in step 106, the terminal device switches the first program interface of the first program displayed on the first screen to being displayed on the second screen. That is, according to the needs of the user, the first program interface of the first program displayed on the first screen as a result of the execution of step 102 can be switched to being displayed on the second screen through the fourth input on the first floating window, and it is convenient for the user to view and operate it.

Based on the embodiment shown in FIG. 1, in an optional embodiment of the present disclosure, the method further includes receiving a fifth input of the user on the first floating window.

In this step, the terminal device receives the fifth input on the first floating window.

Here, the fifth input is a preset input, which may include, but is not limited to, at least one of a click input, a press input, a long press input, a pinch input, a drag input, a slide input, and a swipe input. In other words, the fifth input may be one of, or a combined input of two or more of, the above-mentioned inputs.

Here, optionally, the fifth input is a pressing and sliding input. In the embodiment of the present disclosure, the pressing and sliding input is adopted as the fifth input, which can realize the simplicity of user operations.

In response to the fifth input, the first program is closed.

In this step, specifically, if the terminal device detects that the first floating window is located in a preset area of the second screen, it closes the first program in response to the fifth input.

Here, the first program can be closed simply through the user's fifth input directly received on the first floating window, and this operation is convenient and there is no need to switch to the first screen and find a close button for the first program.

Here, optionally, the preset area is a preset edge area of the second screen.

Here, the fifth input is used to move the first floating window so that it is moved to the preset area of the second screen. The fifth input can enable the first floating window to move along a preset direction which is not particularly limited here.

Of course, the close button for closing the first program can be set on the first floating window.

In an optional embodiment of the present disclosure, the first program is a video playback program, and when a video file currently played by the video playback program is a second video file associated with a first video file, the first display content in the first floating window is a countdown duration of the second video file, which is a playback duration of the second video file.

Here, when the user is watching a video (i.e., the first video file) using the first program, an advertising video (i.e., the second video file), which is not related to the video watched by the user, is often played before the playback of the video starts, and a playback duration of the advertising video is usually displayed on the display screen for the user to view. As a result of step 102, the advertising video of the first program is displayed on the first screen. In order to facilitate the user to view, on the second screen, the remaining playback duration of the advertising video in the first program, the first display content in the first floating window is a countdown duration of the advertising video, so that it is convenient for the user to return to the first program in time to continue watching the video after the advertising video ends.

Figure 7:
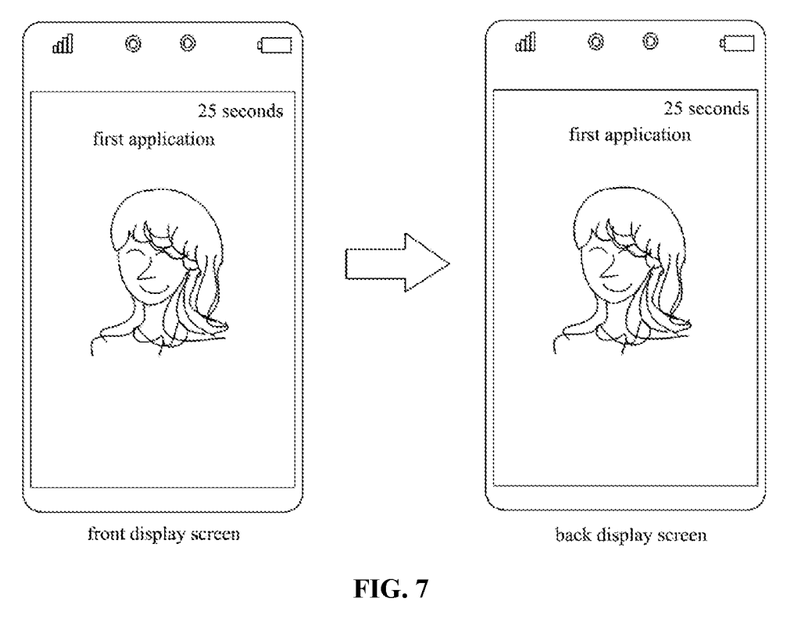
FIG. 7 is a fourth schematic diagram showing a further exemplary implementation process of a display control method of the present disclosure.
Figure 8:
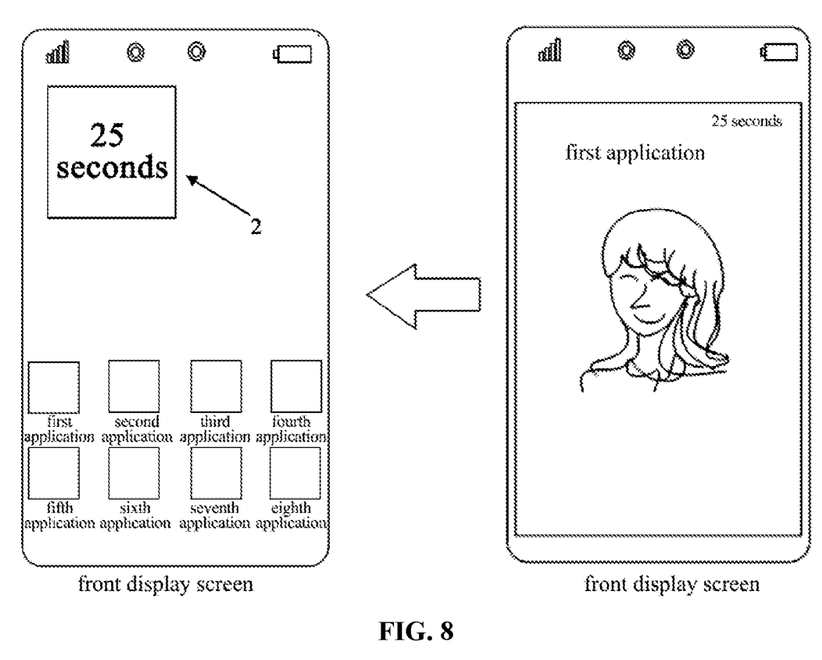
FIG. 8 is a fifth schematic diagram showing a further exemplary implementation process of a display control method of the present disclosure.

As illustrated in a right part of FIG. 7, an advertising video currently played in a first application shows a long-haired girl, and the remaining duration of the advertising video of 25 seconds is shown at an upper right corner of the front display screen (the first screen). As a result of step 102, the display content of the first application is displayed on the back display screen (the second screen). In order to facilitate the user to view the remaining duration of the advertising video in the first application on the front display screen, a first floating window 2 (at an upper left corner in a left part of FIG. 8) is provided to display information on a countdown duration of the advertising video (which is currently 25 seconds and which is enlarged so as to facilitate the user to view), so that the user can return to the first application in time to continue watching the video after the advertising video is over, as shown in FIG. 8.

In the display control method provided by the embodiments of the present disclosure, the first program interface of the first program displayed on the second screen can be switched to being displayed on the first screen through the first input on the first screen, and the user can operate other applications on the second screen, making full use of the additional time that the user needs to wait when the first program is being used. Since the floating window of the first display content that is updated synchronously with the second display content of the first program interface is displayed on the second screen, a display state of the first program interface of the first program can be also viewed while the other programs are being operated.

Based on the above method, an embodiment of the present disclosure provides a terminal for implementing the above method.

Figure 9:
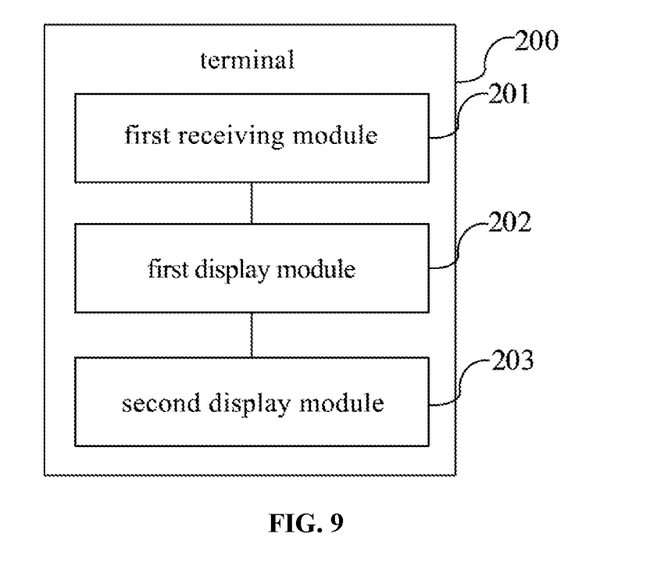
FIG. 9 is a schematic diagram showing a structure of a terminal provided by an embodiment of the disclosure.

FIG. 9 is a schematic diagram showing a structure of a terminal provided by an embodiment of the disclosure. The embodiment of the present disclosure provides a terminal 200 including a first screen and a second screen. The terminal 200 may further include a first receiving module 201 configured to receive a first input of a user on the first screen, a first display module 202 configured to switch a first program interface of a first program from being displayed on the second screen to being displayed on the first screen in response to the first input, and a second display module 203 configured to display a first floating window on the second screen. Furthermore, a first display content in the first floating window is updated synchronously with a second display content of the first program interface.

Further, in the embodiment of the present disclosure, the terminal 200 may further include a second receiving module configured to receive a second input of the user on the first screen, and a first switching module configured to switch the second program interface of the second program from being displayed on the second screen to being displayed on the first screen in response to the second input.

Further, in the embodiment of the present disclosure, the mobile terminal 200 may also include a third display module configured to display a second floating window on the second screen. Furthermore, a third display content of the second floating window is updated synchronously with a fourth display content of the second program interface.

Further, in the embodiment of the present disclosure, the mobile terminal 200 may also include a fifth receiving module configured to receive a third input of the user on the first floating window and the second floating window, and a third switching module configured to switch the first program interface of the first program and the second program interface of the second program from being displayed on the first screen to be displayed in split screens on the second screen in response to the third input.

Further, in the embodiment of the present disclosure, the mobile terminal 200 may also include a third receiving module configured to receive a fourth input of the user on the first floating window, and a second switching module configured to switch the first program interface of the first program from being displayed on the first screen to being displayed on the second screen in response to the fourth input.

Further, in the embodiment of the present disclosure, the mobile terminal 200 may further include a fourth receiving module configured to receive a fifth input of the user on the first floating window, and a control module configured to close the first program in response to the fifth input.

Optionally, the first program is a video playback program, and when a video file currently played by the video playback program is a second video file associated with a first video file, the first display content in the first floating window is a countdown duration of the second video file, which is a playback duration of the second video file.

The mobile terminal provided by the embodiment of the present disclosure is capable of implementing each process implemented by the mobile terminal in the method embodiments of FIGS. 1 to 8, and it will not be described in detail here again so as to avoid repetition.

In the terminal provided by the embodiment of the present disclosure, the first receiving module receives the first input of the user on the first screen; the first display module switches the first program interface of the first program from being displayed on the second screen to being displayed on the first screen in response to the first input; and the second display module displays the first floating window on the second screen. In this way, the first program interface of the first program can be switched from being displayed on the second screen to being displayed on the first screen through the first input on the first screen, and the user can operate other applications on the second screen, making full use of the additional time that the user needs to wait when the first program is being used. Since the floating window of the first display content that is updated synchronously with the second display content of the first program interface is displayed on the second screen, a display state of the first program interface of the first program can be also viewed while the other programs are being operated.

Figure 10:
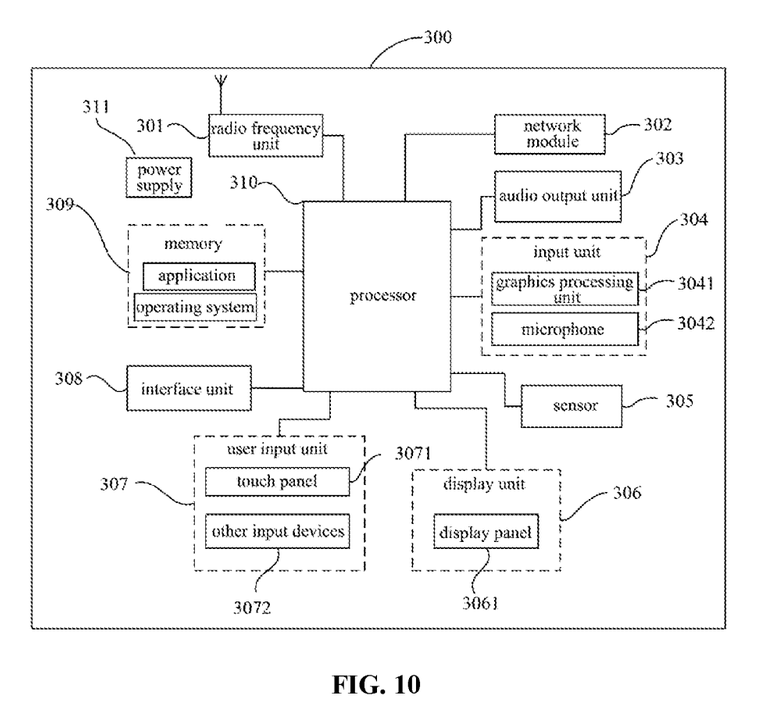
FIG. 10 is a schematic diagram showing a hardware structure of a terminal provided by an embodiment of the disclosure.

FIG. 10 is a schematic diagram showing a hardware structure of a terminal for implementing various embodiments of the present disclosure.

The terminal 300 includes, without limitation, a radio frequency unit 301, a network module 302, an audio output unit 303, an input unit 304, a sensor 305, a display unit 306, a user input unit 307, an interface unit 308, a memory 309, a processor 310, a power supply 311 and other components. As will be understood by those skilled in the art, the structure of the terminal shown in FIG. 10 does not constitute any limitation on the terminal, and the terminal may include more or fewer components than those shown in the figure, or a combination of certain components, or different arrangements of the components. In the embodiments of the present disclosure, the terminal includes, but is not limited to, a mobile phone, a tablet computer, a notebook computer, a palmtop computer, a vehicle-mounted terminal, a wearable device, a pedometer and the like.

The processor 310 is configured to receive a first input of a user on a first screen, to switch a first program interface of a first program from being displayed on a second screen to being displayed on the first screen in response to the first input, and to display a first floating window on the second screen. Further, a first display content in the first floating window is updated synchronously with a second display content of the first program interface.

In the embodiments of the present disclosure, the first program interface of the first program can be switched from being displayed on the second screen to being displayed on the first screen through the first input on the first screen, and the user can operate other applications on the second screen, making full use of the additional time that the user needs to wait when the first program is being used. Since the floating window of the first display content that is updated synchronously with the second display content of the first program interface is displayed on the second screen, a display state of the first program interface of the first program can be also viewed while the other programs are being operated.

It should be understood that, in the embodiment of the present disclosure, the radio frequency unit 301 can be configured to receive and transmit signals in the process of sending and receiving information or during a call. Specifically, it receives downlink data from a base station and transmits it to the processor 310 which then processes the data, and also transmits uplink data to the base station. Generally, the radio frequency unit 301 includes, without limitation, an antenna, at least one amplifier, a transceiver, a coupler, a low noise amplifier, a duplexer, and the like. Furthermore, the radio frequency unit 301 can communicate with a network and other devices through a wireless communication system.

The terminal provides users with wireless broadband internet access through the network module 302, to help the users to send and receive emails, browse web pages, and access streaming media, for example.

The audio output unit 303 may convert audio data received by the radio frequency unit 301 or the network module 302 or stored in the memory 309 into audio signals and output them as sounds. Moreover, the audio output unit 303 may also provide an audio output related to a specific function performed by the terminal 300, such as a call signal reception sound, a message reception sound, etc. The audio output unit 303 includes a speaker, a buzzer, a receiver, and the like.

The input unit 304 is used to receive audio or video signals. The input unit 304 may include a graphics processing unit (Graphics Processing Unit, GPU) 3041 and a microphone 3042. The graphics processing unit 3041 is configured to process image data of still pictures or videos obtained by an image capture device (such as a camera) in a video capture mode or an image capture mode. An image frame obtained after the processing may be displayed on the display unit 306. The image frame obtained after the processing by the graphics processing 3041 may be stored in the memory 309 (or other storage medium) or sent via the radio frequency unit 301 or the network module 302. The microphone 3042 can receive a sound, and process such sound into audio data. The processed audio data can be converted into a format that can be sent to a mobile communication base station via the radio frequency unit 301 to be output in the case of a telephone call mode.

The terminal 300 further includes at least one sensor 305, such as a light sensor, a motion sensor, and other sensors. Specifically, the light sensor includes an ambient light sensor and a proximity sensor. The ambient light sensor can adjust brightness of a display panel 3061 according to brightness of the ambient light. The proximity sensor can close the display panel 3061 and/or backlight when the terminal 300 is moved to an ear. An accelerometer sensor, as a kind of motion sensor, can detect a magnitude of acceleration in various directions (usually in three axes) and a magnitude and direction of gravity at rest, and can be used for identifying a gesture of the mobile terminal (such as switching between horizontal and vertical screens, related games, magnetometer attitude calibration), vibration recognition related functions (such as a pedometer, knocking), etc. The sensor 305 can further include a fingerprint sensor, a pressure sensor, an iris sensor, a molecular sensor, a gyroscope, a barometer, a hygrometer, a thermometer, an infrared sensor, etc., which will not be described in detail here.

The display unit 306 is used to display information input by the user or provided to the user. The display unit 306 may include a display panel 3061, which may be configured in the form of a liquid crystal display (Liquid Crystal Display, LCD), an organic light-emitting diode (Organic Light-Emitting Diode, OLED), etc.

The user input unit 307 can be used to receive input number or character information, and generate a key signal input related to user settings and function control of the mobile terminal. Specifically, the user input unit 307 includes a touch panel 3071 and other input devices 3072. The touch panel 3071, also called a touch screen, can collect user touch operations on or near it (for example, operations on or near the touch panel 3071 by the user using any suitable object or accessory such as a finger, a stylus, etc.). The touch panel 3071 may include two parts: a touch detection device and a touch controller. Among them, the touch detection device detects a touch position of the user as well as a signal due to the touch operation, and transmits the signal to the touch controller. The touch controller receives the touch information from the touch detection device, converts it into contact coordinates, sends them to the processor 310, and receives and executes a command sent from the processor 310. In addition, the touch panel 3071 can be implemented in various types such as resistive type, capacitive type, infrared type, and surface acoustic wave type. The user input unit 307 may include other input devices 3072 in addition to the touch panel 3071. Specifically, the other input devices 3072 may include, but are not limited to, physical keyboards, function keys (such as volume control buttons, switch buttons, etc.), trackballs, mice, and joysticks, which will not be described in detail here.

Further, the touch panel 3071 can be overlaid on the display panel 3061. If the touch panel 3071 detects a touch operation on or near it, the touch operation will be transmitted to the processor 310 so that a type of the touch event can be determined. Then, the processor 310 provides a corresponding visual output on the display panel 3061 based on the type of the touch event. Although the touch panel 3071 and the display panel 3061 are used as two separate components to implement the input and output functions of the mobile terminal in FIG. 10, they can be integrated together to implement the input and output functions of the mobile terminal in some embodiments, and this is not particularly limited here.

The interface unit 308 is an interface for connecting an external device with the terminal 300. For example, the external device may include a wired or wireless headset port, an external power source (or battery charger) port, a wired or wireless data port, a memory card port, a port for connecting a device with an identification module, an audio input/output (Input/Output, I/O) port, a video I/O port, a headphone port, etc. The interface unit 308 may be used to receive an input (for example, data information, power, etc.) from an external device and transmit the received input to one or more elements in the terminal 300, or may be used to transfer data between the terminal 300 and the external device.

The memory 309 can be used to store software programs and various data. The memory 309 may mainly include a program storage area and a data storage area. The program storage area may store an operating system, an application required by at least one function (such as a sound playback function, an image playback function, etc.), etc. The data storage area can store data created by the use of mobile phones (such as audio data and a phone book), etc. In addition, the memory 309 may include a high-speed random access memory and also a non-volatile memory, such as at least one magnetic disk storage device, a flash memory device, or other volatile solid-state storage devices.

The processor 310 is a control center of the mobile terminal, and uses various interfaces and lines to connect the various parts of the entire mobile terminal, and performs various functions of the mobile terminal and processes data by running or executing software programs and/or modules stored in the memory 309 and calling data stored in the memory 309, so as to monitor the whole mobile terminal. The processor 310 may include one or more processing units. Optionally, the processor 310 may be integrated with an application processor, which mainly deals with the operating system, user interface, and application programs, etc., and a modem processor, which mainly deals with wireless communication. It can be understood that the foregoing modem processor may not be integrated into the processor 310.

The terminal 300 may further include a power source 311 (such as a battery) for supplying power to various components. Optionally, the power source 311 may be logically connected to the processor 310 through a power management system, so that functions of management of charging, discharging, and power consumption and other functions are realized through the power management system.

In addition, the terminal 300 includes some functional modules not shown, which will not be described in detail here.

Optionally, an embodiment of the present disclosure further provides a terminal, including a processor 310, a memory 309, and a computer program stored in the memory 309 and capable of running on the processor 310. Each process of the embodiment of the control display method as described above is implemented when the computer program is executed by the processor 310, and the same technical effect can be achieved, and it will not be described in detail here so as to avoid repetition.

Embodiments of the present disclosure further provide a computer-readable storage medium on which a computer program is stored. Each process of the embodiment of the control display method as described above is implemented when the computer program is executed by a processor, and the same technical effect can be achieved, and it will not be described in detail here so as to avoid repetition. The computer-readable storage medium may be a read-only memory (Read-Only Memory, ROM), a random access memory (Random Access Memory, RAM), a magnetic disk, or an optical disk, for example.

It should be noted that the terms "including", "comprising" or any other variants thereof are intended to refer to a non-exclusive inclusion, so that a process, method, article or device including a series of elements includes not only those elements but also other elements not explicitly listed, or elements inherent to the process, method, article, or device. Without more restrictions, an element defined by a sentence "including a . . . " does not exclude the existence of other identical elements in the process, method, article or device that includes the element.

Through the description of the above embodiments, those skilled in the art can clearly understand that the method of the above embodiments can be implemented by means of software plus a necessary general hardware platform. Of course, it may be implemented by hardware, but in many cases the former is better. Based on such understanding, the technical solution of the present disclosure essentially or a part thereof that contributes to the related art can be embodied in the form of a software product, and the computer software product is stored in a storage medium (such as ROM/RAM, a magnetic disk, an optical disk), and includes several instructions to make a terminal (which can be a mobile phone, a computer, a server, an air conditioner, a network device, or the like) execute the methods described in the various embodiments of the present disclosure.

The embodiments of the present disclosure are described above with reference to the accompanying drawings, but the present disclosure is not limited to the above-mentioned specific embodiments. The above-mentioned specific embodiments are only illustrative and not restrictive. Under the enlightenment of the present disclosure, those of ordinary skill in the art can make many forms without departing from the spirit of the present disclosure and the scope of protection of the claims, and all of the forms should fall within the protection of the present disclosure.

What is claimed is:

1. A display control method, which is applied to a terminal device that comprises a first screen and a second screen, the method comprising:
   receiving a first input of a user on the first screen;
   switching a first program interface of a first program from being displayed on the second screen to being displayed on the first screen in response to the first input; and
   displaying a first floating window on the second screen, wherein a first display content in the first floating window is updated synchronously with a second display content of the first program interface.

2. The display control method according to claim 1, wherein after switching the first program interface of the first program from being displayed on the second screen to being displayed on the first screen in response to the first input, the method further comprises:
   receiving a second input of the user on the first screen; and
   switching a second program interface of a second program from being displayed on the second screen to being displayed on the first screen in response to the second input.

3. The display control method according to claim 2, wherein after switching the second program interface of the second program from being displayed on the second screen to being displayed on the first screen in response to the second input, the method further comprises:
   displaying a second floating window on the second screen, wherein a third display content of the second floating window is updated synchronously with a fourth display content of the second program interface.

4. The display control method according to claim 3, wherein after displaying the second floating window on the second screen, the method further comprises:
   receiving a third input of the user on the first floating window and the second floating window; and
   switching the first program interface of the first program and the second program interface of the second program from being displayed on the first screen to being displayed in split screens on the second screen in response to the third input.

5. The display control method according to claim 1, wherein after displaying the first floating window on the second screen, the method further comprises:
   receiving a fourth input of the user on the first floating window; and
   switching the first program interface of the first program from being displayed on the first screen to being displayed on the second screen in response to the fourth input.

6. The display control method according to claim 1, wherein after displaying the first floating window on the second screen, the method further comprises:
   receiving a fifth input of the user on the first floating window; and
   closing the first program in response to the fifth input.

7. The display control method according to claim 1, wherein the first program is a video playback program, and when a video file currently played by the video playback program is a second video file associated with a first video file, the first display content in the first floating window is a countdown duration of the second video file, which is a playback duration of the second video file.

8. A terminal device, comprising a processor, a memory, and a computer program stored on the memory and capable of running on the processor, wherein steps of a display control method are realized when the computer program is executed by the processor, wherein the method is applied to the terminal device that comprises a first screen and a second screen, the method comprising:
   receiving a first input of a user on the first screen;
   switching a first program interface of a first program from being displayed on the second screen to being displayed on the first screen in response to the first input; and
   displaying a first floating window on the second screen, wherein a first display content in the first floating window is updated synchronously with a second display content of the first program interface.

9. The terminal device according to claim 8, wherein after switching the first program interface of the first program from being displayed on the second screen to being displayed on the first screen in response to the first input, the method further comprises:
   receiving a second input of the user on the first screen; and
   switching a second program interface of a second program from being displayed on the second screen to being displayed on the first screen in response to the second input.

10. The terminal device according to claim 9, wherein after switching the second program interface of the second program from being displayed on the second screen to being displayed on the first screen in response to the second input, the method further comprises:

displaying a second floating window on the second screen,
wherein a third display content of the second floating window is updated synchronously with a fourth display content of the second program interface.

11. The terminal device according to claim 10, wherein after displaying the second floating window on the second screen, the method further comprises:
receiving a third input of the user on the first floating window and the second floating window; and
switching the first program interface of the first program and the second program interface of the second program from being displayed on the first screen to being displayed in split screens on the second screen in response to the third input.

12. The terminal device according to claim 8, wherein after displaying the first floating window on the second screen, the method further comprises:
receiving a fourth input of the user on the first floating window; and
switching the first program interface of the first program from being displayed on the first screen to being displayed on the second screen in response to the fourth input.

13. The terminal device according to claim 8, wherein after displaying the first floating window on the second screen, the method further comprises:
receiving a fifth input of the user on the first floating window; and
closing the first program in response to the fifth input.

14. The terminal device according to claim 8, wherein the first program is a video playback program, and when a video file currently played by the video playback program is a second video file associated with a first video file, the first display content in the first floating window is a countdown duration of the second video file, which is a playback duration of the second video file.

15. A non-transitory computer-readable storage medium having a computer program stored thereon, wherein steps of a display control method are realized when the computer program is executed by a processor, wherein the terminal device comprises a first screen and a second screen, the method comprising:
receiving a first input of a user on the first screen;
switching a first program interface of a first program from being displayed on the second screen to being displayed on the first screen in response to the first input; and
displaying a first floating window on the second screen,
wherein a first display content in the first floating window is updated synchronously with a second display content of the first program interface.

16. The non-transitory computer-readable storage medium according to claim 15, wherein after switching the first program interface of the first program from being displayed on the second screen to being displayed on the first screen in response to the first input, the method further comprises:
receiving a second input of the user on the first screen; and
switching a second program interface of a second program from being displayed on the second screen to being displayed on the first screen in response to the second input.

17. The non-transitory computer-readable storage medium according to claim 16, wherein after switching the second program interface of the second program from being displayed on the second screen to being displayed on the first screen in response to the second input, the method further comprises:
displaying a second floating window on the second screen,
wherein a third display content of the second floating window is updated synchronously with a fourth display content of the second program interface.

18. The non-transitory computer-readable storage medium according to claim 17, wherein after displaying the second floating window on the second screen, the method further comprises:
receiving a third input of the user on the first floating window and the second floating window; and
switching the first program interface of the first program and the second program interface of the second program from being displayed on the first screen to being displayed in split screens on the second screen in response to the third input.

19. The non-transitory computer-readable storage medium according to claim 15, wherein after displaying the first floating window on the second screen, the method further comprises:
receiving a fourth input of the user on the first floating window; and
switching the first program interface of the first program from being displayed on the first screen to being displayed on the second screen in response to the fourth input.

20. The non-transitory computer-readable storage medium according to claim 15, wherein after displaying the first floating window on the second screen, the method further comprises:
receiving a fifth input of the user on the first floating window; and
closing the first program in response to the fifth input,
wherein the first program is a video playback program, and when a video file currently played by the video playback program is a second video file associated with a first video file, the first display content in the first floating window is a countdown duration of the second video file, which is a playback duration of the second video file.

* * * * *